(No Model.)
F. P. SHARE.
VEHICLE WHEEL.
No. 535,775. Patented Mar. 12, 1895.
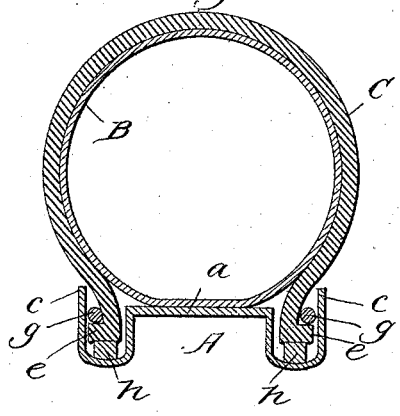
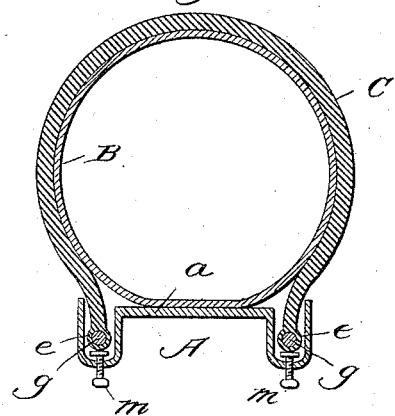
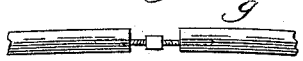
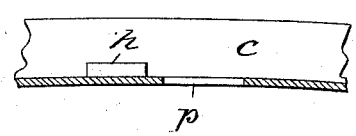
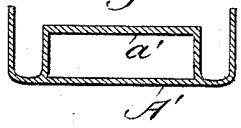
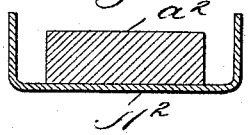
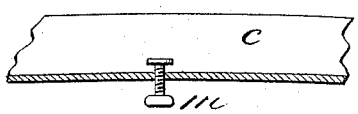
WITNESSES:
Edwin L. Bradford
N Curtis Lammond
INVENTOR
Frank P. Share
BY
ATTORNEY

UNITED STATES PATENT OFFICE.

FRANK PERRY SHARE, OF BROOKLYN, ASSIGNOR TO ELLIOTT BURRIS, OF NEW YORK, N. Y.

VEHICLE-WHEEL.

SPECIFICATION forming part of Letters Patent No. 535,775, dated March 12, 1895.

Application filed September 9, 1893. Serial No. 485,202. (No model.)

*To all whom it may concern:*

Be it known that I, FRANK PERRY SHARE, a citizen of the United States, residing at 331 McDonough street, Brooklyn, in the county of Kings and State of New York, have invented certain new and useful Improvements in Vehicle-Wheels with Pneumatic Tires; and I do hereby declare the following to be a full, clear, and exact description of the invention, such as will enable others skilled in the art to which it appertains to make and use the same.

This invention relates to vehicle wheels provided with pneumatic tires, and consists in certain improvements in such wheels as hereinafter described and claimed.

In the accompanying drawings—Figure 1 represents a section of a wheel rim and tire provided with my improvements. Fig. 2 is a similar section showing a modification in construction. Fig. 3 illustrates a modified form of a securing ring or band. Fig. 4 is a section taken in a groove of the wheel rim. Figs. 5 and 6 show in section different forms of wheel rim. Fig. 7 is a section showing a modification.

Heretofore, for the purpose of securing the cover of a pneumatic tire to the rim of a wheel, the rim has been formed with a central groove and divergent sides or flanges and with annular ledges on each side of the central groove to form seats for the beaded edges of the cover of the tire; the air tube being placed in the central groove, so that one of the beaded edges of the cover is at the lowest point at the bottom of said central groove. The air-tube being then inflated and expanded by air-pressure, the beaded edges of the cover are moved in opposite directions to the annular seats formed for them, on which they rest, the air tube being somewhat expanded over the beaded edges to hold the latter in their seats, (see Patent No. 488,494, of December 20, 1892;) but this construction is found in practice to be somewhat defective, as, owing to the outside pressure against the elastic tire, the beaded edges of the cover are not effectually retained in their seats and often work inward from their seats and slip down in the main, central groove.

My invention has for its object to obviate these defects and furnish a construction of wheel rim and tire by which the tire is held firmly in place and other advantages are obtained.

A designates the rim of a wheel, which is formed with an annular, central table or bearing surface $a$ for the annular air-tube B. Along the sides of the table A, are two annular grooves $c$.

C indicates the cover of the tire, provided with beaded edges $e$ which are received in the grooves $c$ when the tire is adjusted in place.

$g$ indicates two rings or bands which are constructed of material which is not adapted to be stretched and is sufficiently non-extensible for securing the tire cover as hereinafter stated. The bands $g$ are of greater diameter than the wheel rim at the bottom of the grooves $c$, and are less in diameter than the rim at the upper edges of the flanges of the grooves, and it will accordingly be understood that the natural circumferential plane of these bands, according to their diameter, is at a point somewhere between the bottom of the recess or groove $c$ and the edge of the flange of the rim.

The cover C and air tube may be adjusted in place by placing one beaded edge $e$ in the bottom of one of the grooves $c$, on one side of the table $a$, the air tube being placed on said table and partially inflated to facilitate manipulation and the cover being pressed over it, and the opposite edge $e$ being slipped into the opposite groove $c$. This is readily accomplished owing to the fact that when the greater portion of the band or wire constituting the edge $e$, has been located within the groove or seat $c$ the said edge may be pulled into an elliptical form and the remaining portion forced over the edge of the flange of the rim, when it then assumes a circular form and is properly located below the said edge of the rim.

$h$ indicates pieces of suitable material which are placed in the grooves $c$ under the edges of the cover C. The pieces $h$ may be placed at different points in the grooves, and serve to sustain the edges of the cover in proper position in the grooves, between the bottoms and tops of said grooves, in their true circumferential planes as heretofore described, preventing the escape of the cover from the grooves, and leaving a space between the inside or smaller circumference of the edges *e* and the exterior circumference of the bottoms of the grooves *c* which space is filled by suitable supporting pieces or circular platforms *h* which may be inserted in the grooves *c*, through openings *p* in the bottom, as seen in Fig. 4, or instead of said pieces, cords may be drawn into the grooves under the edges of the cover.

When a continuous cord (or, if desirable, one in which the ends are not connected) is used, it will be found that the resiliency of the edge of the body of the shoe or covering is such that after the cord has been inserted at one point and forced under the edge *e* it will be grasped with sufficient tenacity to hold the same and to facilitate the introduction of the balance of said cord to its proper place.

In place of the pieces *h*, or the cords, adjusting screws *m* may be connected with the wheel rim, at various points, so as to enter the grooves at the bottom and raise the edges of the cover C to the same relative positions in the grooves; or the screws *m* may be located so as to enter the grooves laterally and extend therein over or under the edges of the cover C; but in practice I much prefer the use of a continuous cord, as the gist of my invention lies in the generic idea of filling the space which naturally exists between the edges *e* and the bottom of the side grooves *c* owing to the difference in diameters of the two.

The rings or bands *g*, may be embedded in the edges of the cover C, as shown in Fig. 2, or they may be made separate and placed in position on the tops of the beaded edges of the cover. The said rings or bands *g* may be made solid and continuous or may be made with two ends connected by a screw rod for adjusting them in proper size before being placed in position in the wheel rim. See Fig. 3.

I am aware that it is not new to construct a rim with a central supporting seat for the inner inflatable tube and with grooves or recesses each side of said central supporting seat, the bottoms of which are of less diameter than the extreme edges of the flanges of the rim.

I am also aware that it is not new to form the edges of the shoe with inextensible reinforces or bands of greater diameter than the bottom of the grooves *c*, and of less diameter than the extreme edges of the flanges of the rim.

I am also aware that it is not new to close the throat or space between the flanges of the rim and the reinforced edges of the shoe by an inextensible wire or cord of less diameter than that of the extreme edge of the flange, and do not make claim to any such construction, but on the contrary the gist of my invention lies in providing the rim with a central table or support for the inner inflatable tube, with grooves *c* each side of said table and locating therein cords or other flexible supports for the inextensible edges of the shoe of less area in cross section than the distance from the supporting plane of the central table to the bottom of the grooves *c*, whereby when the parts are in proper relation and the inner tube is inflated, the inextensible edges of the shoe will be properly supported and the projecting central table will prevent any sidewise movement of the edges of the shoe.

I claim—

In a vehicle wheel, a peripheral rim provided with a central annular table or seat to support the inner inflatable tube, and with two annular grooves, one each side of said central table or seat, said grooves being of less diameter at their bottoms than the edges of the flanges of the rim and also of less diameter than the central table or seat, in combination with an inner inflatable tube and exterior cover or shoe, the latter having its edges provided with inextensible bands or wires of less diameter than the central table, but of greater diameter than the bottoms of the side grooves, and a removable or adjustable platform or support of less diameter than the central table, of greater diameter than the bottoms of the side grooves, and in cross section less than the depth of the side grooves, substantially as and for the purposes set forth.

In testimony whereof I have affixed my signature in presence of two witnesses.

FRANK PERRY SHARE.

Witnesses:
  ROBT. E. WILLIAMS,
  ELLIOTT BURRIS.